(12) United States Patent
Song et al.

(10) Patent No.: US 12,407,783 B2
(45) Date of Patent: Sep. 2, 2025

(54) DOUBLE-MICROPHONE ARRAY ECHO ELIMINATING METHOD, DEVICE AND ELECTRONIC EQUIPMENT

(71) Applicant: Shenzhen Bluetrum Technology Co., Ltd., Shenzhen (CN)

(72) Inventors: Minghui Song, Shenzhen (CN); Jinhong Lin, Shenzhen (CN)

(73) Assignee: Shenzhen Bluetrum Technology Co., Ltd., Shenzhen (CN)

( * ) Notice: Subject to any disclaimer, the term of this patent is extended or adjusted under 35 U.S.C. 154(b) by 429 days.

(21) Appl. No.: 18/054,153

(22) Filed: Nov. 10, 2022

(65) Prior Publication Data
US 2023/0353683 A1  Nov. 2, 2023

(30) Foreign Application Priority Data

Apr. 28, 2022 (CN) .......................... 202210470223.9

(51) Int. Cl.
*H04M 9/08* (2006.01)
*G10L 21/0208* (2013.01)
(Continued)

(52) U.S. Cl.
CPC ......... *H04M 9/082* (2013.01); *G10L 21/0232* (2013.01); *G10L 21/034* (2013.01);
(Continued)

(58) Field of Classification Search
CPC ............... H04M 9/082; G10L 21/0232; G10L 21/034; G10L 25/18
See application file for complete search history.

(56) References Cited

U.S. PATENT DOCUMENTS

| 10,192,567 B1 | 1/2019 | Kamdar et al. |
| 2010/0217606 A1* | 8/2010 | Osada ............ H04B 1/662 375/240 |
| 2014/0126737 A1* | 5/2014 | Burnett ............ H04R 3/005 381/71.6 |

(Continued)

FOREIGN PATENT DOCUMENTS

| CN | 103348408 A | 10/2013 |
| CN | 107483761 A | 12/2017 |

(Continued)

OTHER PUBLICATIONS

Hoshuyama, "An Echo Canceller Using Smoothed-Coefficient Filter with Adaptive Time Constant Controlled by High-Pass Errors" (Year: 2008).*

(Continued)

*Primary Examiner* — Hai Phan
*Assistant Examiner* — Alvin Iskender

(57) ABSTRACT

Embodiments of the present application relate to a dual-microphone array echo cancellation method, device and electronic equipment, comprises: the acquired distal signal, the first proximal signal and the second proximal signal are processed by linear filtering; obtain initial suppression gain factors and variable step-size factors of the first near-end signal and the second near-end signal; performing residual echo suppression on the first error frequency spectrum and the second error frequency spectrum by using an adaptive zero-pole echo canceller to obtain a target frequency spectrum signal; performing sub-band range selection on the initial suppression gain factors to obtain a smooth factor, and performing full-band smoothing and exponential operation to obtain a secondary suppression gain factor; performing filtering processing on the target frequency spectrum signal by using the secondary suppression gain factor to obtain a target near-end voice signal.

8 Claims, 3 Drawing Sheets

(51) Int. Cl.
  *G10L 21/0216* (2013.01)
  *G10L 21/0232* (2013.01)
  *G10L 21/034* (2013.01)
  *G10L 25/18* (2013.01)
(52) U.S. Cl.
  CPC .... *G10L 25/18* (2013.01); *G10L 2021/02082* (2013.01); *G10L 2021/02165* (2013.01)

(56) References Cited

U.S. PATENT DOCUMENTS

| | | | |
|---|---|---|---|
| 2015/0213811 A1 | 7/2015 | Elko et al. | |
| 2015/0350777 A1 | 12/2015 | Yang et al. | |
| 2016/0012828 A1* | 1/2016 | Chatlani | G10L 21/0232 704/205 |
| 2016/0365099 A1* | 12/2016 | Pandey | G10L 21/0264 |

FOREIGN PATENT DOCUMENTS

| | | |
|---|---|---|
| CN | 107564539 A | 1/2018 |
| CN | 111199748 A | 5/2020 |
| CN | 111341336 A | 6/2020 |
| CN | 111917926 A | 11/2020 |
| CN | 112017679 A | 12/2020 |
| CN | 113179354 A | 7/2021 |
| CN | 113921029 A | 1/2022 |
| CN | 114360565 A | 4/2022 |
| JP | 2009021741 A | 1/2009 |
| KR | 20170052056 A | 5/2017 |
| TW | 201015541 A1 | 4/2010 |
| TW | 201023640 A1 | 6/2010 |
| WO | 2020252629 A1 | 12/2020 |

OTHER PUBLICATIONS

Hoshuyama, "Dual-Microphone Echo Canceller for Suppressing Loud Nonlinear Echo", 2012 (Year: 2012).*

Osamu Hoshuyama, Dual-microphone echo canceller for suppressing loud nonlinear echo, 2012 IEEE International Conference on Acoustics, Speech and Signal Processing(ICASSP), IEEE, Mar. 25, 2012, pp. 181-184.

* cited by examiner

DOUBLE-MICROPHONE ARRAY ECHO ELIMINATING METHOD, DEVICE AND ELECTRONIC EQUIPMENT

CROSS REFERENCE TO RELATED APPLICATIONS

The present application claims the benefit of Chinese Patent Application No. 202210470223.9 filed on Apr. 28, 2022, the contents of which are incorporated herein by reference in their entirety.

TECHNICAL FIELD

Embodiments of the present application relate to the technical field of echo cancellation, and in particular, relate to a dual-microphone array echo cancellation method, a dual-microphone array echo cancellation device and electronic equipment.

BACKGROUND

Echo cancellation (AEC) technology is widely used in modern communication electronic equipments. In the process of a phone conversation between two parties, the near-end microphone will collect the sound of the speaker so that the far end can hear its own echo. Therefore, the performance of echo cancellation seriously affects the quality of phone conversation between the two parties.

SUMMARY

An objective of embodiments of the present application is to provide a dual-microphone array echo cancellation method, device and electronic equipment, which can effectively improve the echo cancellation effect and improve the quality of voice call.

An embodiment of the present invention provides a dual-microphone array echo cancellation method, and the method comprises:
acquiring far-end signals generated by an electronic equipment during a phone conversation, and a first near-end signal and a second near-end signal of a dual microphone array;
performing linear filtering processing on the far-end signals, the first near-end signal and the second near-end signal to obtain a first initial error frequency spectrum and a second initial error frequency spectrum;
performing centroid fitting on the first initial error frequency spectrum and the second initial error frequency spectrum respectively to obtain initial suppression gain factors of the first near-end signal and the second near-end signal, and using the initial suppression gain factors as variable step-size factors for linear filtering processing of the next frame;
performing residual echo suppression on the first error frequency spectrum and the second error frequency spectrum by using an adaptive zero-pole echo canceller to obtain a target frequency spectrum signal;
after performing sub-band range selection on the initial suppression gain factors, obtaining a smooth factor, and performing full-band smoothing and exponential operation to obtain a secondary suppression gain factor;
performing filtering processing on the target frequency spectrum signal by using the secondary suppression gain factor to obtain a target near-end voice signal.

An embodiment of the present invention provides an echo cancellation device for a dual microphone array, and the device comprises:
a signal acquisition module, being configured to acquire far-end signals generated by an electronic equipment during a phone conversation, and a first near-end signal and a second near-end signal of a dual microphone array;
a linear filtering module, being configured to perform linear filtering processing on the far-end signals, the first near-end signal and the second near-end signal to obtain a first initial error frequency spectrum and a second initial error frequency spectrum;
a centroid fitting module, being configured to perform centroid fitting on the first initial error frequency spectrum and the second initial error frequency spectrum respectively to obtain initial suppression gain factors of the first near-end signal and the second near-end signal, and use the initial suppression gain factors as variable step-size factors for linear filtering processing of the next frame;
a residual echo suppression module, being configured to perform residual echo suppression on the first error frequency spectrum and the second error frequency spectrum by using an adaptive zero-pole echo canceller to obtain a target frequency spectrum signal;
a smoothing module, being configured to obtain a smooth factor and perform full-band smoothing and exponential operation to obtain a secondary suppression gain factor after performing sub-band range selection on the initial suppression gain factor;
a target acquisition module, being configured to perform filtering processing on the target frequency spectrum signal by using the secondary suppression gain factor to obtain a target near-end voice signal.

An embodiment of the present invention provides an electronic equipment, which comprises:
a dual microphone array and at least one processor, and
a memory, wherein the memory is communicatively connected with the at least one processor, and the memory stores instructions executable by the at least one processor, and the instructions, when executed by the at least one processor, cause the electronic equipment to execute the method of any of the aspects described above.

An embodiment of the present invention provides a nonvolatile computer readable storage medium, wherein the computer readable storage medium stores computer-executable instructions which, when executed by an electronic equipment, cause the electronic equipment to execute the method of any of the aspects described above.

According to the dual-microphone array echo cancellation method, device and electronic equipment provided by the embodiments of the present invention, far-end signals generated by an electronic equipment during a phone conversation as well as a first near-end signal and a second near-end signal of a dual microphone array are acquired, then preliminary filtering processing is performed on the far-end signals and the near-end signals of the dual microphone array, e.g., linear filtering processing may be performed on the far-end signals, the first near-end signal and the second near-end signal to obtain a first initial error frequency spectrum and a second initial error frequency spectrum so as to preliminarily cancel the echo; next, centroid fitting is performed on the first initial error frequency spectrum and the second initial error frequency spectrum respectively to obtain initial suppression gain factors of the first near-end signal and the second near-end signal, and the initial suppression gain factors are used as variable step-size factors for linear filtering processing of the next frame; residual echo suppression is performed on the first error frequency spectrum and the second error frequency spectrum by using an adaptive zero-pole echo canceller to obtain a target frequency spectrum signal so as to achieve residual echo suppression; after performing subband range selection on the initial suppression gain factor, a smooth factor is obtained, and full-band smoothing and exponential operation are performed to obtain a secondary suppression gain factor; filtering processing is performed on the target frequency spectrum signal by using the secondary suppression gain factor to achieve secondary suppression gain filtering and obtain a target near-end voice signal, thereby effectively improving the echo cancellation effect and improving the quality of voice call.

BRIEF DESCRIPTION OF THE DRAWINGS

One or more embodiments are illustrated by pictures in corresponding attached drawings, and this does not constitute limitation on the embodiments. Elements with the same reference numerals in the attached drawings are shown as similar elements, and the pictures in the attached drawings do not constitute scale limitation unless otherwise stated particularly.

DETAILED DESCRIPTION

The present application will be described in detail hereinafter with reference to specific embodiments. The following embodiments will facilitate the further understanding of the present application by those skilled in the art, but are not intended to limit the present application in any way. It shall be noted that, those of ordinary skill in the art can make several modifications and improvements without departing from the concept of the present application. All these modifications and improvements belong to the scope claimed in the present application.

In order to make objectives, technical solutions and advantages of the present application clearer, the present application will be further described in detail hereinafter with reference to attached drawings and embodiments. It shall be appreciated that, the specific embodiments described herein are only used to explain the present application, and are not used to limit the present application.

It shall be noted that, all features in the embodiments of the present application may be combined with each other without conflict, and all the combinations are within the scope claimed in the present application. In addition, although functional module division is made in the schematic diagrams of the device and logical sequences are shown in the flowchart diagrams, in some cases, the steps shown or described can be executed with module division and sequences different from those in the schematic diagrams of the device and the flowchart diagrams. Furthermore, words such as "first", "second", and "third" used herein do not limit the data and execution order, but only distinguish same or similar items with basically the same functions and effects.

Unless otherwise defined, all technical and scientific terms used in this specification have the same meanings as commonly understood by those skilled in the art of the present application. In this specification, the terms used in the specification of the present application are only for the purpose of describing specific embodiments, and are not intended to limit the present application. The term "and/or" used in this specification comprises any and all combinations of one or more associated items listed.

In addition, the technical features involved in various embodiments of the present application described below can be combined with each other as long as they do not conflict with each other.

The dual-microphone array echo cancellation method and device provided by the embodiments of the present application may be applied to electronic equipments, and the electronic equipments may be smart phones, Bluetooth headphones, wired headphones and other equipments used for phone communication. Taking the Bluetooth headphones as an example, the Bluetooth headphones are connected via Bluetooth with the smart phone which is required to make a conversation, and a user can make the conversation by wearing the Bluetooth headphones.

Figure 1:
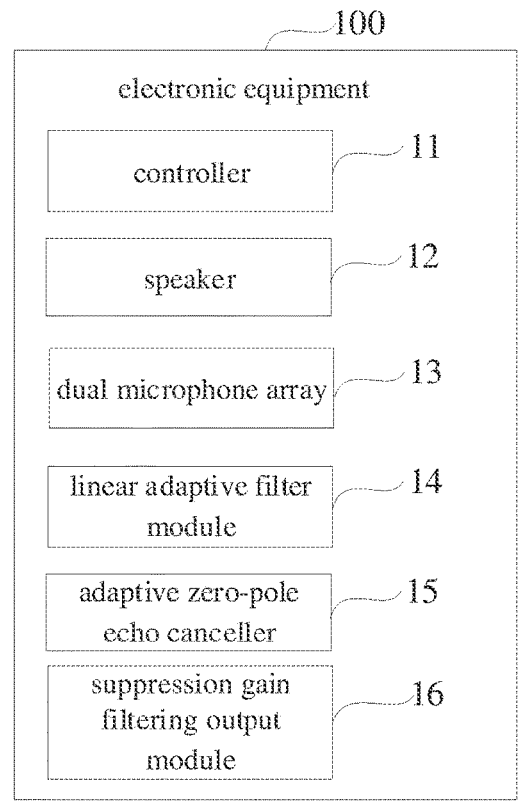
FIG. 1 is a schematic block diagram of an electronic equipment according to an embodiment of the present invention.
Figure 2:
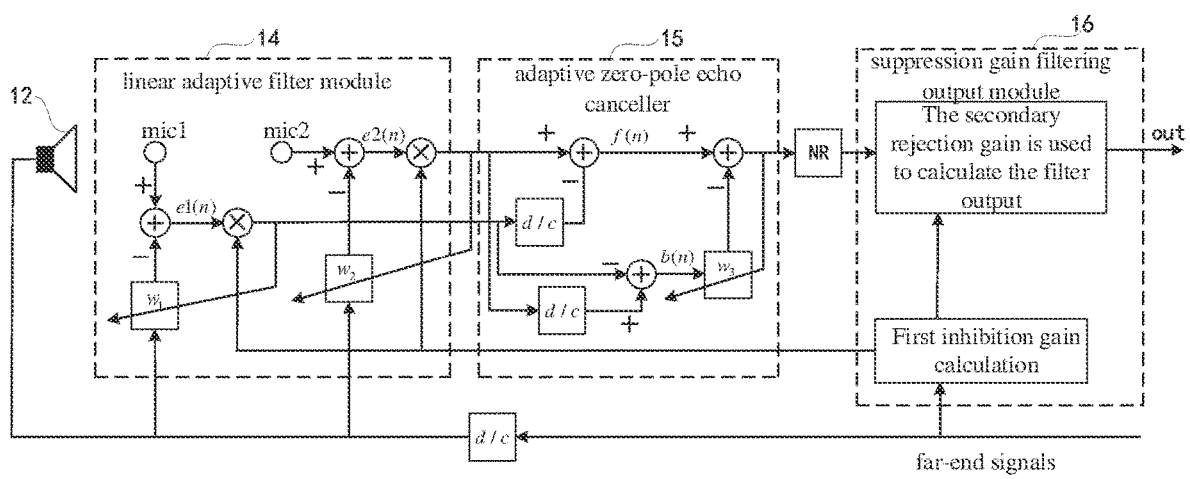
FIG. 2 is a circuit structural diagram of an electronic equipment according to an embodiment of the present invention.
Figure 3:
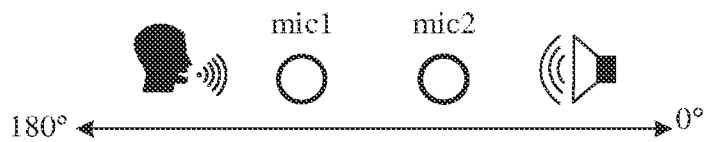
FIG. 3 is a schematic structural diagram of a dual microphone array of an electronic equipment according to an embodiment of the present invention.

As shown in FIG. 1 and FIG. 2, an electronic equipment 100 comprises a controller 11, a speaker 12 and a dual microphone array 13, and the controller 11 is connected with the speaker 12 and the dual microphone array 13. The speaker 12 is used for playing sounds which are far-end signals. The dual microphone array 13 is used for collecting sounds, and the sounds collected by the dual microphone array 13 comprise the voice of the user, echo and background noise, which are near-end signals. Furthermore, the dual microphone array 13 comprises two microphones, namely, a first microphone mic and a second microphone mic2. The dual microphone array 13 is an end-firing arrangement. As shown in FIG. 3, the dual microphone array 13 may suppress the sound in the non-gain direction, i.e., the sound in the direction of the speaker 12, by adopting the end-firing arrangement, so as to retain the sound in the desired gain direction, that is, the sound in the speaking direction of the user at the near end. The controller 11 is configured to acquire the far-end signals generated by the user during the phone conversation, and the first near-end signal of the first microphone mic and the second near-end signal of the second microphone mic2.

The electronic equipment 100 further comprises a linear adaptive filter module 14, an adaptive zero-pole echo canceller 15, a single-channel noise reduction module NR and a suppression gain filtering output module 16, and the controller 11 is connected with the linear adaptive filter module 14, the adaptive zero-pole echo canceller 15, the single-channel noise reduction module NR and the suppression gain filtering output module 16.

The linear adaptive filter module 14 is configured to perform linear filtering processing on the far-end signals, the first near-end signal and the second near-end signal to obtain a first initial error frequency spectrum and a second initial error frequency spectrum, and the controller 11 acquires the first initial error frequency spectrum and the second initial error frequency spectrum from the linear adaptive filter module 14.

The linear adaptive filter module 14 is further configured to perform centroid fitting on the first initial error frequency spectrum and the second initial error frequency spectrum respectively to obtain initial suppression gain factors of the first near-end signal and the second near-end signal, and use the initial suppression gain factors as variable step-size factors for linear filtering processing of the next frame, and the controller 11 obtains the first error frequency spectrum and the first initial suppression gain factor as well as the second error frequency spectrum and the second initial suppression gain factor from the linear adaptive filter module 14, and the first initial suppression gain factor and the second initial suppression gain factor constitute the initial suppression gain factors.

The adaptive zero-pole echo canceller 15 is configured to perform residual echo suppression on the first error frequency spectrum and the second error frequency spectrum to obtain a target frequency spectrum signal.

The suppression gain filtering output module 16 is configured to obtain a smooth factor and perform full-band smoothing and exponential operation to obtain a secondary suppression gain factor after performing sub-band range selection on the initial suppression gain factor; and perform filtering processing on the target frequency spectrum signal by using the secondary suppression gain factor to obtain a target near-end voice signal, and output the target near-end voice signal.

The electronic equipment 100 further comprises a time delay compensation operation module d/c, which is configured to calculate the time delay compensation between the far-end signal and each of the first near-end signal and/or the second near-end signal respectively.

By performing the preliminary filtering processing, centroid fitting, residual echo suppression and secondary filtering processing on the far-end signals and the near-end signals by using the controller 11, the linear adaptive filter module 14, the adaptive zero-pole echo canceller 15 and the suppression gain filtering output module 16, the electronic equipment 100 realizes the echo cancellation during the phone conversation, solves the problems of poor echo cancellation effect and large residual echo, and effectively improves the quality of voice call.

Figure 4:
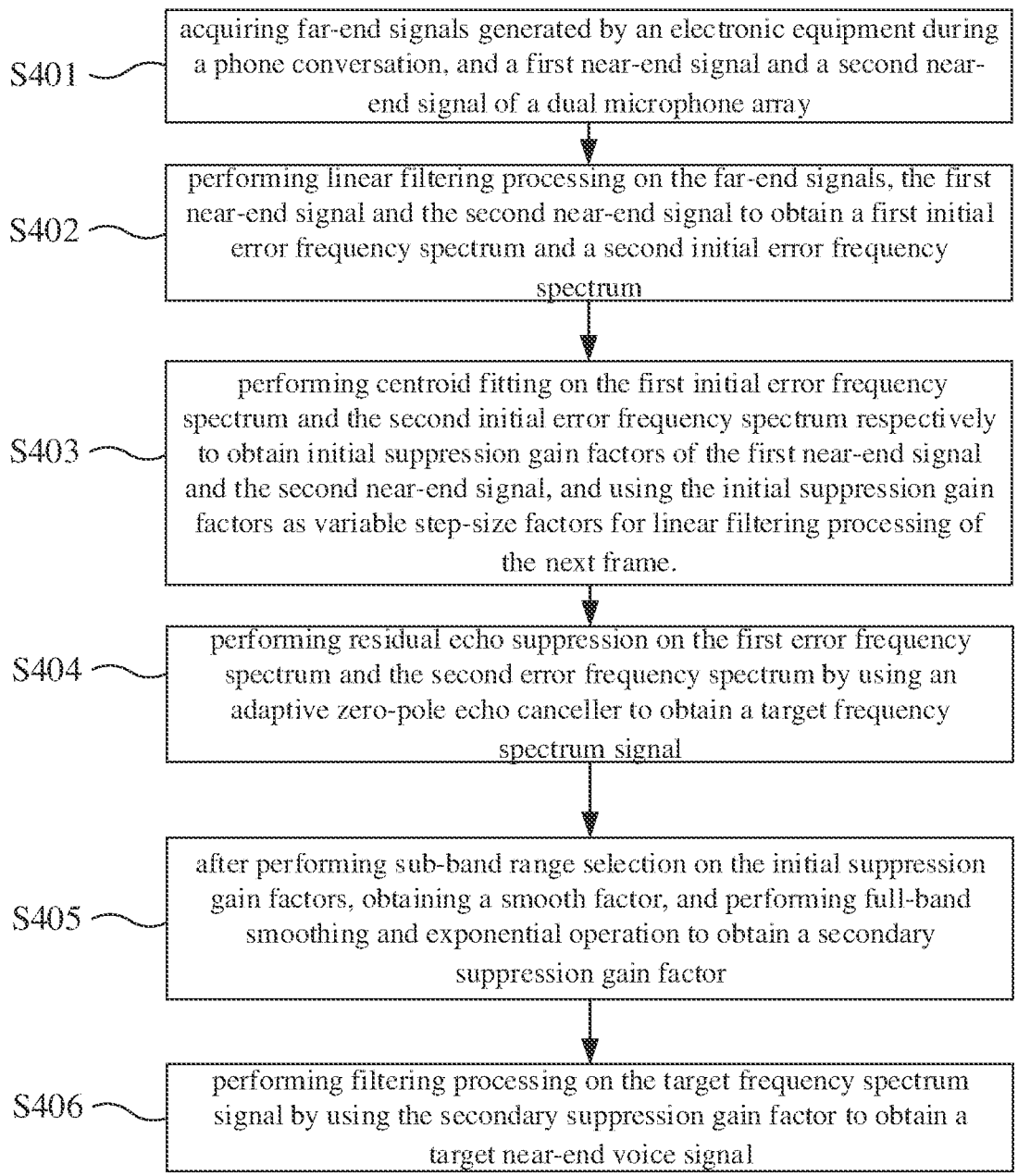
FIG. 4 is a schematic flowchart diagram of one embodiment of a dual-microphone array echo cancellation method according to an embodiment of the present invention.

Please refer to FIG. 4, which is a schematic flowchart diagram of dual-microphone array echo cancellation method provided according to an embodiment of the present invention. The method is applied to the electronic equipment 100 and may be executed by a processor 111 in the electronic equipment 100. As shown in FIG. 4, the method comprises:

S401: acquiring far-end signals generated by an electronic equipment during a phone conversation, and a first near-end signal and a second near-end signal of a dual microphone array.

A controller of the electronic equipment acquires the far-end signals and the near-end signals generated by the electronic equipment during a phone conversation, wherein the far-end signals are sound signals played by the speaker, and the near-end signals include the voice of the user, echo and/or background noise. Furthermore, the dual microphone array comprises a first microphone mic1 and a second microphone mic2, the first microphone generates the first near-end signal and the second microphone generates the second near-end signal.

The far-end signal is represented by x(n), and the far-end signal x(n) is represented by Equation 1:

$$x(n)=[x(i),x(i-1),\ldots,x(i-M+1)]^T \quad \text{Equation 1;}$$

The first near-end signal is represented by d1(n), and the first near-end signal d1(n) is represented by Equation 2:

$$d1(n)=[d1(i),d1(i-1),\ldots,d1(i-M+1)]^T \quad \text{Equation 2;}$$

The second near-end signal is represented by d2(n), and the second near-end signal d2(n) is represented by Equation 3:

$$d2(n)=[d2(i),d2(i-1),\ldots,d2(i-M+1)]^T \quad \text{Equation 3;}$$

wherein M represents the number of sampling points of the far-end signal x(n) or the first near-end signal d1(n) and the second near-end signal d2(n) in a frame, and i represents the ith sampling point of the controller of the electronic equipment when collecting the far-end signal x(n) or the near-end signal d1(n) and the second near-end signal d2(n).

S402: performing linear filtering processing on the far-end signals, the first near-end signal and the second near-end signal to obtain a first initial error frequency spectrum and a second initial error frequency spectrum.

After the controller of the electronic equipment obtains the far-end signal x(n), the first near-end signal d1(n) and the second near-end signal d2(n), the linear adaptive filter module performs linear filtering processing on the far-end signal x(n), the first near-end signal d1(n) and the second near-end signal d2(n) to obtain the first initial error frequency spectrum and the second initial error frequency spectrum.

In some embodiments, the operation of performing linear filtering processing on the far-end signals, the first near-end signal and the second near-end signal to obtain a first initial error frequency spectrum and a second initial error frequency spectrum comprises:

performing Fourier transform on the far-end signals to obtain far-end frequency domain information, performing Fourier transform on the first near-end signal to obtain first near-end frequency domain information, and performing Fourier transform on the second near-end signal to obtain second near-end frequency domain information;

performing filtering processing on the far-end frequency domain information by using the updated filter weight coefficient of the previous frame to obtain an echo frequency spectrum;

subtracting the echo frequency spectrum from the first near-end frequency domain information to obtain a first initial error frequency spectrum;

subtracting the echo frequency spectrum from the second near-end frequency domain information to obtain a second initial error frequency spectrum.

Specifically, first, Fourier transform is performed on the far-end signal x(n) to obtain the far-end frequency domain information X(n), Fourier transform is performed on the first near-end signal d1(n) to obtain the first near-end frequency domain information D1(n), and then Fourier transform is performed on the second near-end signal d2(n) to obtain the second near-end frequency domain information D2(n). The far-end frequency domain information X(n) is represented by Equation 4, the first near-end frequency domain information D1(n) is represented by Equation 5, and the second near-end frequency domain information D2(n) is represented by Equation 6:

$$X(n)=fft([x(n-1);x(n)]\cdot win) \quad \text{Equation 4;}$$

$$D1(n)=fft([d1(n-1);d1(n)]\cdot win) \quad \text{Equation 5;}$$

$$D2(n)=fft([d2(n-1);d2(n)]\cdot win) \quad \text{Equation 6;}$$

wherein X(n) represents the far-end frequency domain information of the nth frame, D1(n) represents the first near-end frequency domain information of the nth frame, D2(n) represents the second near-end frequency domain information of the nth frame, win represents the Hanning window with a length of 2*M, and fft represents the Fourier transform. The near-end frequency domain information D(n) includes the first near-end frequency domain information D1(n) and the second near-end frequency domain information D2(n).

Then, filtering processing is performed on the far-end frequency domain information X(n) by using the updated filter weight coefficient of the previous frame to obtain the echo frequency spectrum. Because the echo path and the process of phone communication are fixed, the far-end frequency domain information may be subjected to delay alignment respectively with the first near-end frequency domain information D1(n) and the second near-end frequency domain information D2(n) before filtering, so as to estimate the first echo frequency spectrum Y1(n) and the second echo frequency spectrum Y2(n). The updated filter weight coefficient of the previous frame includes the updated filter weight coefficient $W_1(n-1)$ of the previous frame for the first microphone and the updated filter weight coefficient $W_2(n-1)$ of the previous frame for the second microphone. That is, the far-end frequency domain information X(n) is filtered in the frequency domain, the obtained echo frequency spectrum is represented by Y(n), and the echo frequency spectrum Y(n) includes the first echo frequency spectrum Y1(n) and the second echo frequency spectrum Y2(n) which are calculated by using Equation 7 and Equation 8:

$$Y1(n)=W_1(n-1)\cdot X(n) \quad \text{Equation 7;}$$

$$Y2(n)=W_2(n-1)\cdot X(n) \quad \text{Equation 8.}$$

wherein $W_1(n-1)$ represents the updated filter weight coefficient of the previous frame for the first microphone, and $W_2(n-1)$ represents the updated filter weight coefficient of the previous frame for the second microphone.

Finally, the echo frequency spectrum Y(n) is subtracted from the near-end frequency domain information D(n) to obtain the first initial error frequency spectrum E1(n) and the second initial error frequency spectrum E2(n). That is, the first echo frequency spectrum Y1(n) is subtracted from the first near-end frequency domain information D1(n) to obtain the first initial error frequency spectrum E1(n); and the second echo frequency spectrum Y2(n) is subtracted from the second near-end frequency domain information D2(n) to obtain the second initial error frequency spectrum E2(n). E1(n) and E2(n) are represented by Equation 9 and Equation 10:

$$E1(n)=D1(n-1)-Y1(n) \quad \text{Equation 9;}$$

$$E2(n)=D2(n-1)-Y2(n) \quad \text{Equation 10.}$$

The first initial error frequency spectrum E1(n) and the second initial error frequency spectrum E2(n) that are obtained can preliminarily eliminate the linear echo of the first microphone and the second microphone.

S403: performing centroid fitting on the first initial error frequency spectrum and the second initial error frequency spectrum respectively to obtain initial suppression gain factors of the first near-end signal and the second near-end signal, and using the initial suppression gain factors as variable step-size factors for linear filtering processing of the next frame.

In order to reduce most of the linear echo of the near-end signal, first it is necessary to calculate the initial suppression gain factors, and the initial suppression gain factors include the first initial suppression gain factor and the second initial suppression gain factor. The operation of performing centroid fitting on the first initial error frequency spectrum and the second initial error frequency spectrum respectively to obtain initial suppression gain factors of the first near-end signal and the second near-end signal may comprise:

calculating a first cross-correlation coefficient between the far-end frequency domain information and the first initial error frequency spectrum, and a second cross-correlation coefficient between the far-end frequency domain information and the second initial error frequency spectrum;

performing centroid fitting on the first cross-correlation coefficient to obtain a first initial suppression gain factor, and performing centroid fitting on the second cross-correlation coefficient to obtain a second initial suppression gain factor;

multiplying the first initial suppression gain factor by the first initial error frequency spectrum to obtain the first error frequency spectrum, and multiplying the second initial suppression gain factor by the second initial error frequency spectrum to obtain the second error frequency spectrum.

Specifically, first, the first cross-correlation coefficient between the far-end frequency domain information X(n) and the first initial error frequency spectrum E1(n) is calculated. Similarly, the second cross-correlation coefficient between the far-end frequency domain information X(n) and the second initial error frequency spectrum E2(n) is calculated.

The first cross-correlation coefficient and the second cross-correlation coefficient are calculated by using Equations 11 to 17.

$$S_{e1}(n)=\text{gamma}\cdot S_{e1}(n-1)+(1-\text{gamma})E1(n)\cdot\text{conj}(E1(n)) \quad \text{Equation 11;}$$

$$S_{e2}(n)=\text{gamma}\cdot S_{e2}(n-1)+(1-\text{gamma})E2(n)\cdot\text{conj}(E2(n)) \quad \text{Equation 12;}$$

$$S_x(n)=\text{gamma}\cdot S_x(n-1)+(1-\text{gamma})X(n)\cdot\text{conj}(X(n)) \quad \text{Equation 13;}$$

$$S_{xe1}(n)=\text{gamma}\cdot S_{xe1}(n-1)+(1-\text{gamma})S_x(n)\cdot\text{conj}(S_{xe1}(n)) \quad \text{Equation 14;}$$

$$S_{xe2}(n)=\text{gamma}\cdot S_{xe2}(n-1)+(1-\text{gamma})S_x(n)\cdot\text{conj}(S_{xe2}(n)) \quad \text{Equation 15;}$$

$$\text{Coh}_{xe1}(n)=S_{xe1}(n)\cdot\text{conj}(S_{xe1}(n))/(S_x(n)\cdot S_{e1}(n)+\sigma) \quad \text{Equation 16;}$$

$$\text{Coh}_{xe2}(n)=S_{xe2}(n)\cdot\text{conj}(S_{xe2}(n))/(S_x(n)\cdot S_{e2}(n)+\sigma) \quad \text{Equation 17.}$$

wherein gamma represents the smooth factor, of which the value is generally a number less than 1 but close to 1, e.g., 0.9; σ represents the division protection factor, which may be set σ>0; conj represents conjugate operation; $S_{e1}(n)$ represents a smooth power spectrum of the first initial error frequency spectrum; $S_{e2}(n)$ represents the smooth power spectrum of the second initial error frequency spectrum; $S_x(n)$ represents the smooth power spectrum of the far-end frequency domain information, $S_{xe1}(n)$ represents the smooth power spectrum of the far-end frequency domain information, the first near-end frequency domain information, the first initial error frequency spectrum, $S_{xe2}(n)$ represents the smooth power spectrum of the far-end frequency domain information, the second near-end frequency domain information and the second initial error frequency spectrum; $Coh_{xe1}(n)$ represents the first cross-correlation coefficient, and $Coh_{xe2}(n)$ represents the second cross-correlation coefficient.

Then, centroid fitting is performed on the first cross-correlation coefficient to obtain the first initial suppression gain factor, and centroid fitting is performed on the second cross-correlation coefficient to obtain the second initial suppression gain factor, and the first initial suppression gain factor and the second initial suppression gain factor may be calculated by using Equation 18 and Equation 19:

$$g1(i) = 1 - \sum_{j=i-k}^{i+k} Coh_{xe1}(j); \qquad \text{Equation 18}$$

$$g2(i) = 1 - \sum_{j=i-k}^{i+k} Coh_{xe2}(j); \qquad \text{Equation 19}$$

wherein k represents the centroid fitting distance, i represents the ith frequency point of the nth frame, and g1(i) represents the first initial suppression gain factor; and g2(i) represents the second initial suppression gain factor.

After the first initial suppression gain factor g1(i) and the second initial suppression gain factor g2(i) are obtained, the first initial suppression gain factor g1(i) is multiplied by the first initial error frequency spectrum E1(n) to obtain the first error frequency spectrum, and the second initial suppression gain factor g2(i) is multiplied by the second initial error frequency spectrum E2(n) to obtain the second error frequency spectrum, and the first error frequency spectrum and the second error frequency spectrum are represented by Equation 20 and Equation 21:

$$E1'(n)=E1(n) \cdot g1(n) \qquad \text{Equation 20;}$$

$$E2'(n)=E2(n) \cdot g2(n) \qquad \text{Equation 21.}$$

wherein E1'(n) represents the first error frequency spectrum, and E2'(n) represents the second error frequency spectrum.

The first error frequency spectrum E1'(n) and the second error frequency spectrum E2'(n) that are obtained can reduce the near-end frequency domain signals of most linear echoes.

In some embodiments, in order to improve the accuracy and robustness of the filter, the filter weight coefficient may be updated in real time. Therefore, the operation of using the initial suppression gain factors as variable step-size factors for linear filtering processing of the next frame may comprise:

updating the filter weight coefficient of the previous frame based on the first initial suppression gain factor and the second initial suppression gain factor to obtain the filter weight coefficient of the current frame;

using the first initial suppression gain factor and the second initial suppression gain factor as variable step-size factors for linear filtering processing of the next frame, if the first initial suppression gain factor and the second initial suppression gain factor are smaller than a preset threshold.

Specifically, the filter weight coefficient W(n−1) of the previous frame is updated based on the first initial suppression gain factor g1(i) and the second initial suppression gain factor g2(i) to obtain the filter weight coefficient of the current frame, wherein the filter weight coefficient of the previous frame includes the updated filter weight coefficient $W_1(n-1)$ of the previous frame for the first microphone and the updated filter weight coefficient $W_2(n-1)$ of the previous frame for the second microphone, and the filter weight coefficients of the current frame are represented by Equation 22 and Equation 23:

$$W_1(n)=W_1(n-1)+\mu \cdot g1(n) \cdot \Delta W_1 \qquad \text{Equation 22;}$$

$$W_2(n)=W_2(n-1)+\mu \cdot g2(n) \cdot \Delta W_2 \qquad \text{Equation 23.}$$

wherein $W_1(n)$ represents the filter weight coefficient of the current frame for the first microphone mic and $W_2(n)$ represents the filter weight coefficient of the current frame for the second microphone mic2; μ represents a fixed step factor, of which the value is usually in the range of 0<μ<2; $\Delta W_1$ represents the adjustment amount of the filter coefficient of the first microphone mic1, and $\Delta W_2$ represents the adjustment amount of the filter coefficient of the second microphone mic2. The calculation methods of the adjustment amount of the filter coefficient include but not limited to normalized least mean square error (NLMS), recursive least squares (RLS) and Kalman algorithm or the like; g1(n) represents the first initial suppression gain factor, and g2(n) represents the second initial suppression gain factor. g1(n) and g2(n) are used as variable step-size factors for linear filtering processing of the next frame, and the step of performing filtering processing on the far-end frequency domain information is executed so that the filter is more robust.

Therefore, when the filter does not converge, the residual echo is too large and the step size becomes larger, which helps the filter to converge quickly. When the filter gradually converges, for example, when the first initial suppression gain factor g1(n) and the second initial suppression gain factor g2(n) gradually become smaller to be less than a preset threshold and close to 0 (for example, the preset threshold is 0.01), the step size gradually decreases, which indicates that the residual echo in the first initial error frequency spectrum E1(n) and the second initial error frequency spectrum E2(n) is small or in an echoless state. Then, according to step S402, filtering processing is performed on the far-end frequency domain information X(n) using the filter weight coefficients (($W_1(n)$ and $W_2(n)$)) of the current frame to obtain the echo frequency spectrum, and then the initial error frequency spectrum is calculated.

S404: performing residual echo suppression on the first error frequency spectrum and the second error frequency spectrum by using an adaptive zero-pole echo canceller to obtain a target frequency spectrum signal.

In some embodiments, the operation of performing residual echo suppression on the first error frequency spectrum and the second error frequency spectrum by using an adaptive zero-pole echo canceller to obtain a target frequency spectrum signal may comprise:

calculating a first branch frequency spectrum signal based on the first error frequency spectrum and a time delay compensation, and calculating a second branch frequency spectrum signal based on the second error frequency spectrum and the time delay compensation;

calculating a differential signal cross-correlation power spectrum coefficient between the first branch frequency spectrum signal and the second branch frequency spectrum signal and a weight coefficient of the adaptive zero-pole echo canceller based on the first branch frequency spectrum signal and the second branch frequency spectrum signal;

performing residual echo suppression on the first error frequency spectrum and the second error frequency spectrum by using the weight coefficient of the adaptive zero-pole echo canceller to obtain the target frequency spectrum signal.

Specifically, first, the frequency spectrum signals of two branches are calculated. That is, the first branch frequency spectrum signal is calculated based on the first error frequency spectrum and the time delay compensation, and the second branch frequency spectrum signal is calculated based on the second error frequency spectrum and the time delay compensation. Then, a differential signal cross-correlation power spectrum coefficient between the first branch frequency spectrum signal and the second branch frequency spectrum signal as well as a weight coefficient of the adaptive zero-pole echo canceller are calculated based on the first branch frequency spectrum signal and the second branch frequency spectrum signal, and finally residual echo suppression is performed on the first error frequency spectrum and the second error frequency spectrum by using the weight coefficient of the adaptive zero-pole echo canceller to obtain the target frequency spectrum signal. These operations may be performed by using Equation 24 to Equation 29:

$$F(n)=E2(n)-\text{delay}(E1(n)) \quad \text{Equation 24};$$

$$B(n)=\text{delay}(E2(n))-E1(n) \quad \text{Equation 25};$$

$$R_{FB}(n)=\alpha F(n)B(n)+\beta R_{FB}(n-1) \quad \text{Equation 26};$$

$$R_{BB}(n)=\alpha B^2(n)+\beta R_{BB}(n-1) \quad \text{Equation 27};$$

$$W_3(n)=R_{FB}(n)/R_{BB}(n) \quad \text{Equation 28};$$

$$E(n)=F(n)-W_3(n)\cdot B(n) \quad \text{Equation 29}.$$

wherein F(n) represents the second branch frequency spectrum signal; B(n) represents the first branch frequency spectrum signal; delay represents time delay compensation operation, delay(E1(n)) represents the time delay compensation of the first branch, and delay (E2(n)) represents the time delay compensation of the second branch; the range of the value of $\alpha$ is $0 \leq \alpha \leq 1$, the range of the value of $\beta$ is $0 \leq \beta \leq 1$, and $\alpha+\beta=1$; $W_3(n)$ represents the weight coefficient of the adaptive zero-pole echo canceller, $R_{FB}$ (n) represents the differential signal cross-correlation power spectrum coefficient, $R_{BB}$ (n) represents the second branch autocorrelation power spectrum; and E(n) represents the target frequency spectrum signal.

S405: after performing sub-band range selection on the initial suppression gain factors, obtaining a smooth factor, and performing full-band smoothing and exponential operation to obtain a secondary suppression gain factor.

In order to improve the echo cancellation effect, smoothing may be performed on the initial suppression gain factor.

In some embodiments, the initial suppression gain factors include the first initial suppression gain factor and the second initial suppression gain factor, the operation of after performing sub-band range selection on the initial suppression gain factors, obtaining a smooth factor, and performing full-band smoothing and exponential operation to obtain a secondary suppression gain factor may comprise:

performing sub-band range selection on the initial suppression gain factors to obtain a plurality of sub-band ranges;

sorting the initial suppression gain factors in the plurality of sub-band ranges, and calculating a suppression gain coefficient smooth factor;

performing full-band smoothing processing and exponential operation on the initial suppression gain factor by using the suppression gain coefficient smooth factor to obtain the secondary suppression gain factor.

Specifically, the sub-band ranges may be selected by selecting the sub-band minimum minFre, the sub-band maximum maxFre and the reference sub-band point refFre. Then, the sub-band ranges are sorted for example in an ascending order to obtain the sequence hNI, and the reference value Refer is selected according to Equation 30, which is as follows:

$$\text{Refer}=hNI[\text{refFre}] \quad \text{Equation 30}.$$

wherein Refer represents the reference value; refFre represents the reference sub-band point; hNI represents the sequence of the sub-band range in the ascending order.

The suppression gain coefficient smooth factor may be calculated by using Equation 31, which is as follows:

$$\text{Smooth}(n)=1/(\text{max Fre}-\text{MINfre})\cdot\Sigma_{i=\min Fre}^{\max Fre}hNI[i] \quad \text{Equation 31}.$$

wherein Smooth(n) represents the suppression gain coefficient smooth factor; minFre represents the sub-band minimum; maxFre represents the sub-band maximum, and refFre represents the reference sub-band point; i represents the ith frequency point of the nth frame.

After obtaining the suppression gain coefficient smooth factor Smooth(n), full-band smoothing processing and exponential operation are performed on the initial suppression gain factor by using the suppression gain coefficient smooth factor Smooth(n) to obtain the secondary suppression gain factor, which is represented by Equation 32:

$$G(i)=\text{Smooth}(n)\cdot\text{Refer}+(1-\text{Smooth}(n))/(0.5\cdot g1(i)+0.5\cdot g2(i)) \quad \text{Equation 32};$$

wherein the initial suppression gain factor includes the first initial suppression gain factor g1(i) and the second initial suppression gain factor g2(i), and G(i) represents the secondary suppression gain factor.

S406: performing filtering processing on the target frequency spectrum signal by using the secondary suppression gain factor to obtain a target near-end voice signal.

In order to cancel the residual echo as much as possible, and at the same time to avoid the possible damage to the near-end signal by the secondary filtering so as to obtain the optimal output, the operation of performing filtering processing on the target frequency spectrum signal by using the secondary suppression gain factor to obtain a target near-end voice signal may comprise:

performing noise reduction processing on the target frequency spectrum signal;

multiplying the secondary suppression gain factor by the target frequency spectrum signal after noise reduction, then performing inverse Fourier transform, and performing overlap-adding to obtain the target near-end voice signal.

Specifically, first, noise reduction processing is performed on the target frequency spectrum signal, then after the secondary suppression gain factor is multiplied by the target frequency spectrum signal after noise reduction, inverse Fourier transform is performed, and overlap-adding is performed to obtain the target near-end voice signal. These operations are performed according to Equation 33 to Equation 36:

$$E_{nr}(n)=NR(E'(n)) \quad \text{Equation 33;}$$

$$e(n)=\text{ifft}(E_{nr}((n) \cdot G(n)) \quad \text{Equation 34;}$$

$$\text{out}(n)=e(1:M)+\text{ola\_buf} \quad \text{Equation 35;}$$

$$\text{ola\_buf}=e(M+1:2*M) \quad \text{Equation 36.}$$

wherein ola_buf represents the overlap-adding reserved block, ifft represents inverse Fourier transform; NR represents noise reduction algorithm processing, $E_{nr}(n)$ represents the target frequency spectrum signal after noise reduction processing, $E'(n)$ represents the error frequency spectrum, which includes the first error frequency spectrum $E1'(n)$ and the second error frequency spectrum $E2'(n)$; out(n) represents the target near-end voice signal.

According to the embodiment of the present invention, far-end signals generated by an electronic equipment during a phone conversation as well as a first near-end signal and a second near-end signal of a dual microphone array are acquired, then preliminary filtering processing is performed on the far-end signals and the near-end signals of the dual microphone array, e.g., linear filtering processing may be performed on the far-end signals, the first near-end signal and the second near-end signal to obtain a first initial error frequency spectrum and a second initial error frequency spectrum so as to preliminarily cancel the echo; next, centroid fitting is performed on the first initial error frequency spectrum and the second initial error frequency spectrum respectively to obtain initial suppression gain factors of the first near-end signal and the second near-end signal, and the initial suppression gain factors are used as variable step-size factors for linear filtering processing of the next frame; residual echo suppression is performed on the first error frequency spectrum and the second error frequency spectrum by using an adaptive zero-pole echo canceller to obtain a target frequency spectrum signal so as to achieve residual echo suppression; after performing sub-band range selection on the initial suppression gain factor, a smooth factor is obtained, and full-band smoothing and exponential operation are performed to obtain a secondary suppression gain factor; filtering processing is performed on the target frequency spectrum signal by using the secondary suppression gain factor to achieve secondary suppression gain filtering and obtain a target near-end voice signal, thereby effectively improving the echo cancellation effect and improving the quality of voice call.

Figure 5:
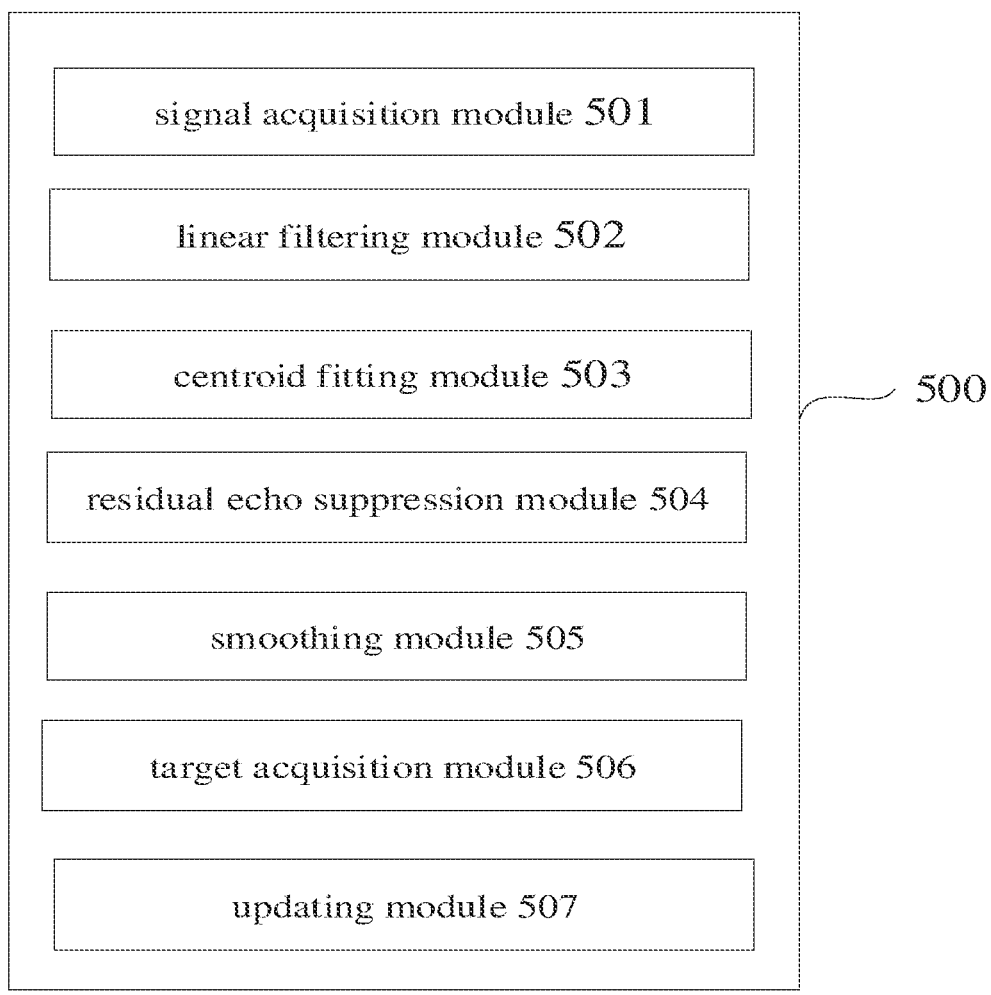
FIG. 5 is a schematic structural diagram of one embodiment of a dual-microphone array echo cancellation device according to the present invention.

Correspondingly, as shown in FIG. 5, an embodiment of the present invention further provides a dual-microphone array echo cancellation device, which may be used in an electronic equipment. The dual-microphone array echo cancellation device 500 comprises:

a signal acquisition module 501, being configured to acquire far-end signals generated by an electronic equipment during a phone conversation, and a first near-end signal and a second near-end signal of the dual microphone array;

a linear filtering module 502, being configured to perform linear filtering processing on the far-end signals, the first near-end signal and the second near-end signal to obtain a first initial error frequency spectrum and a second initial error frequency spectrum;

a centroid fitting module 503, being configured to perform centroid fitting on the first initial error frequency spectrum and the second initial error frequency spectrum respectively to obtain initial suppression gain factors of the first near-end signal and the second near-end signal, and use the initial suppression gain factors as variable step-size factors for linear filtering processing of the next frame;

a residual echo suppression module 504, being configured to perform residual echo suppression on the first error frequency spectrum and the second error frequency spectrum by using an adaptive zero-pole echo canceller to obtain a target frequency spectrum signal;

a smoothing module 505, being configured to obtain a smooth factor and perform full-band smoothing and exponential operation to obtain a secondary suppression gain factor after performing sub-band range selection on the initial suppression gain factor;

a target acquisition module 506, being configured to perform filtering processing on the target frequency spectrum signal by using the secondary suppression gain factor to obtain a target near-end voice signal.

According to the embodiment of the present invention, far-end signals generated by an electronic equipment during a phone conversation as well as a first near-end signal and a second near-end signal of a dual microphone array are acquired, then preliminary filtering processing is performed on the far-end signals and the near-end signals of the dual microphone array, e.g., linear filtering processing may be performed on the far-end signals, the first near-end signal and the second near-end signal to obtain a first initial error frequency spectrum and a second initial error frequency spectrum so as to preliminarily cancel the echo; next, centroid fitting is performed on the first initial error frequency spectrum and the second initial error frequency spectrum respectively to obtain initial suppression gain factors of the first near-end signal and the second near-end signal, and the initial suppression gain factors are used as variable step-size factors for linear filtering processing of the next frame; residual echo suppression is performed on the first error frequency spectrum and the second error frequency spectrum by using an adaptive zero-pole echo canceller to obtain a target frequency spectrum signal so as to achieve residual echo suppression; after performing sub-band range selection on the initial suppression gain factor, a smooth factor is obtained, and full-band smoothing and exponential operation are performed to obtain a secondary suppression gain factor; filtering processing is performed on the target frequency spectrum signal by using the secondary suppression gain factor to achieve secondary suppression gain filtering and obtain a target near-end voice signal, thereby effectively improving the echo cancellation effect and improving the quality of voice call.

In other embodiments, the linear filtering module 502 is further configured to: perform Fourier transform on the far-end signals to obtain far-end frequency domain information, performing Fourier transform on the first near-end signal to obtain first near-end frequency domain information, and performing Fourier transform on the second near-end signal to obtain second near-end frequency domain information;

perform filtering processing on the far-end frequency domain information by using the updated filter weight coefficient of the previous frame to obtain an echo frequency spectrum;

subtract the echo frequency spectrum from the first near-end frequency domain information to obtain a first initial error frequency spectrum;

subtract the echo frequency spectrum from the second near-end frequency domain information to obtain a second initial error frequency spectrum.

In other embodiments, the centroid fitting module 503 is further configured to:

calculate a first cross-correlation coefficient between the far-end frequency domain information and the first initial error frequency spectrum, and a second cross-correlation coefficient between the far-end frequency domain information and the second initial error frequency spectrum;

perform centroid fitting on the first cross-correlation coefficient to obtain a first initial suppression gain factor, and perform centroid fitting on the second cross-correlation coefficient to obtain a second initial suppression gain factor;

multiply the first initial suppression gain factor by the first initial error frequency spectrum to obtain the first error frequency spectrum, and multiply the second initial suppression gain factor by the second initial error frequency spectrum to obtain the second error frequency spectrum.

In other embodiments, the echo cancellation device 500 for a dual microphone array further comprises an updating module 507, which is configured to:

update the filter weight coefficient of the previous frame based on the first initial suppression gain factor and the second initial suppression gain factor to obtain the filter weight coefficient of the current frame;

use the first initial suppression gain factor and the second initial suppression gain factor as variable step-size factors for linear filtering processing of the next frame, if the first initial suppression gain factor and the second initial suppression gain factor are smaller than a preset threshold.

In other embodiments, the residual echo suppression module 504 is further configured to:

calculate a first branch frequency spectrum signal based on the first error frequency spectrum and a time delay compensation, and calculating a second branch frequency spectrum signal based on the second error frequency spectrum and the time delay compensation;

calculate a differential signal cross-correlation power spectrum coefficient between the first branch frequency spectrum signal and the second branch frequency spectrum signal and a weight coefficient of the adaptive zero-pole echo canceller based on the first branch frequency spectrum signal and the second branch frequency spectrum signal;

perform residual echo suppression on the first error frequency spectrum and the second error frequency spectrum by using the weight coefficient of the adaptive zero-pole echo canceller to obtain the target frequency spectrum signal.

In other embodiments, the smoothing module 505 is further configured to:

perform sub-band range selection on the initial suppression gain factors to obtain the initial suppression gain factors in a plurality of sub-band ranges;

sort the initial suppression gain factors in the plurality of sub-band ranges, and calculate a suppression gain coefficient smooth factor;

perform full-band smoothing processing and exponential operation on the initial suppression gain factor by using the suppression gain coefficient smooth factor to obtain the secondary suppression gain factor.

In other embodiments, the target acquisition module 506 is further configured to:

perform noise reduction processing on the target frequency spectrum signal;

multiply the secondary suppression gain factor by the target frequency spectrum signal after noise reduction, perform inverse Fourier transform, and perform overlap-adding to obtain the target near-end voice signal.

It shall be noted that, the above device may execute the method provided according to the embodiment of the present application, and has corresponding functional modules and beneficial effects for executing the method. Reference may be made to the method provided according to the embodiment of the present application for technical details not described in detail in the embodiment of the device.

Figure 6:
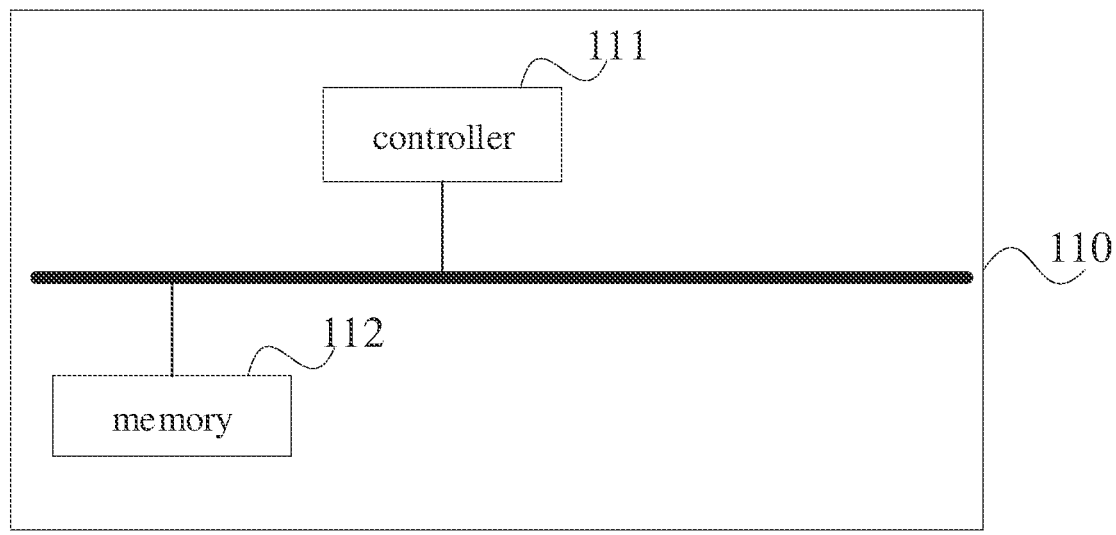
FIG. 6 is a schematic view of the hardware structure of a controller in one embodiment of the electronic equipment according to the present invention.

FIG. 6 is a schematic view of the hardware structure of a controller of the electronic equipment 100 in one embodiment of the electronic equipment 100. As shown in FIG. 6, the controller 110 comprises:

one or more processors 111 and a memory 112. In FIG. 6, one processor 111 and one memory 112 are taken as examples.

The processor 111 and the memory 112 may be connected by a bus or other means, and the bus connection is taken as an example in FIG. 6.

As a nonvolatile computer readable storage medium, the memory 112 may be used to store nonvolatile software programs, nonvolatile computer executable programs and modules, such as program instructions/modules (e.g., the signal acquisition module 501, the linear filtering module 502, the centroid fitting module 503, the residual echo suppression module 504, the smoothing module 505, the target acquisition module 506 and the updating module 507 shown in FIG. 5) corresponding to the dual-microphone array echo cancellation method in the embodiment of the present application. The processor 111 executes various functional applications and data processing of the controller, i.e., implements the dual-microphone array echo cancellation method provided by the above embodiments of the method, by running the nonvolatile software programs, instructions and modules stored in the memory 112.

The memory 112 may comprise a program storage area and a data storage area, wherein the program storage area may store operating systems and application programs required by at least one function; and the data storage area may store data created according to the use of the electronic equipment 100 or the like. In addition, the memory 112 may comprise a high-speed random access memory, and may also comprise a nonvolatile memory, such as at least one magnetic disk memory device, flash memory device, or other nonvolatile solid-state memory devices. In some embodiments, the memory 112 optionally comprises memories remotely provided relative to the processor 111, and these remote memories may be connected to a signal long-time recording equipment through a network. Examples of the above network comprise, but not limited to, the Internet, Intranet, local area networks, mobile communication networks and combinations thereof.

The one or more modules are stored in the memory 112, and when executed by the one or more processors 111, the one or more modules execute the dual-microphone array echo cancellation method in any of the embodiments of the method described above, e.g., execute the above-described method steps of S401 to S406 of the steps of the method in FIG. 4; and implement the functions of the modules 501 to 507 in FIG. 5.

The products described above may execute the method provided according to the embodiments of the present application, and have corresponding functional modules and beneficial effects for executing the method. For technical details not described in detail in this embodiment, reference may be made to the method provided according to the embodiments of the present application.

An embodiment of the present application provides a nonvolatile computer readable storage medium, in which computer executable instructions are stored. The computer executable instructions, when executed by one or more processors, e.g., one processor 111 in FIG. 6, may enable the one or more processors described above to execute the dual-microphone array echo cancellation method in any of the embodiments of the method described above, e.g., execute the above-described method steps of S401 to S406 of the steps of the method in FIG. 4; and implement the functions of the modules 501 to 507 in FIG. 5.

The embodiments of the devices described above are only for illustrative purpose. The units illustrated as separate components may be or may not be physically separated, and components displayed as units may be or may not be physical units. That is, these units and components may be located in one place or distributed over multiple network units. Some or all of the modules may be selected according to actual needs to achieve the purpose of the solution of the embodiment.

From the description of the above embodiments, those of ordinary skill in the art may clearly appreciate that each embodiment may be realized by means of software plus a general hardware platform, and of course, it may also be realized by hardware. As shall be appreciated by those of ordinary skill in the art, the implementation of all or part of the processes in the embodiments of the methods described above may be completed by instructing related hardware through a computer program, and the program may be stored in a computer readable storage medium. When it is executed, the program may comprise the processes of the embodiments of the methods described above. The storage medium may be a magnetic disk, an optical disk, a Read-Only Memory (ROM) or a Random Access Memory (RAM) or the like.

Finally, it shall be noted that, the above embodiments are only used to illustrate the technical solutions of the present invention, and are not intended to limit the present invention. Under the idea of the present invention, technical features in the above embodiments or different embodiments may also be combined, the steps may be implemented in any order, and many other variations in different aspects of the present invention as described above are possible, and these variations are not provided in details for conciseness. Although the present invention has been described in detail with reference to the foregoing embodiments, those of ordinary skill in the art shall appreciate that, the technical solutions described in the foregoing embodiments may still be modified or some of the technical features may be equivalently replaced. These modifications or replacements do not make the essence of the corresponding technical solutions deviate from the scope of the technical solutions of various embodiments of the present invention.

What is claimed is:

1. A dual-microphone array echo cancellation method, the method comprising:
    acquiring far-end signals generated by an electronic equipment during a phone conversation, and a first near-end signal and a second near-end signal of a dual microphone array;
    performing Fourier transform on the far-end signals to obtain far-end frequency domain information, performing Fourier transform on the first near-end signal to obtain first near-end frequency domain information, and performing Fourier transform on the second near-end signal to obtain second near-end frequency domain information;
    performing filtering processing on the far-end frequency domain information by using the updated filter weight coefficient of the previous frame to obtain an echo frequency spectrum;
    subtracting the echo frequency spectrum from the first near-end frequency domain information to obtain a first initial error frequency spectrum;
    subtracting the echo frequency spectrum from the second near-end frequency domain information to obtain a second initial error frequency spectrum;
    performing centroid fitting on the first initial error frequency spectrum and the second initial error frequency spectrum respectively to obtain initial suppression gain factors of the first near-end signal and the second near-end signal, which comprises calculating a first cross-correlation coefficient between the far-end frequency domain information and the first initial error frequency spectrum, and a second cross-correlation coefficient between the far-end frequency domain information and the second initial error frequency spectrum, performing centroid fitting on the first cross-correlation coefficient to obtain a first initial suppression gain factor, and performing centroid fitting on the second cross-correlation coefficient to obtain a second initial suppression gain factor, multiplying the first initial suppression gain factor by the first initial error frequency spectrum to obtain the first error frequency spectrum, and multiplying the second initial suppression gain factor by the second initial error frequency spectrum to obtain the second error frequency spectrum, and using the initial suppression gain factors as variable step-size factors for linear filtering processing of the next frame;
    performing residual echo suppression on the first error frequency spectrum and the second error frequency spectrum by using an adaptive zero-pole echo canceller to obtain a target frequency spectrum signal;
    after performing sub-band range selection on the initial suppression gain factors, obtaining a smooth factor, and performing full-band smoothing and exponential operation to obtain a secondary suppression gain factor;
    performing filtering processing on the target frequency spectrum signal by using the secondary suppression gain factor to obtain a target near-end voice signal.

2. The method of claim 1, the operation of using the initial suppression gain factors as variable step-size factors for linear filtering processing of the next frame comprises:
    updating the filter weight coefficient of the previous frame based on the first initial suppression gain factor and the second initial suppression gain factor to obtain the filter weight coefficient of the current frame;
    using the first initial suppression gain factor and the second initial suppression gain factor as variable step-size factors for linear filtering processing of the next frame, if the first initial suppression gain factor and the second initial suppression gain factor are smaller than a preset threshold.

3. The method of claim 1, the operation of performing residual echo suppression on the first error frequency spectrum and the second error frequency spectrum by using an adaptive zero-pole echo canceller to obtain a target frequency spectrum signal comprises:
calculating a first branch frequency spectrum signal based on the first error frequency spectrum and a time delay compensation, and calculating a second branch frequency spectrum signal based on the second error frequency spectrum and the time delay compensation;
calculating a differential signal cross-correlation power spectrum coefficient between the first branch frequency spectrum signal and the second branch frequency spectrum signal and a weight coefficient of the adaptive zero-pole echo canceller based on the first branch frequency spectrum signal and the second branch frequency spectrum signal;
performing residual echo suppression on the first error frequency spectrum and the second error frequency spectrum by using the weight coefficient of the adaptive zero-pole echo canceller to obtain the target frequency spectrum signal.

4. The method of claim 1, the operation of after performing sub-band range selection on the initial suppression gain factors, obtaining a smooth factor, and performing full-band smoothing and exponential operation to obtain a secondary suppression gain factor comprises:
performing sub-band range selection on the initial suppression gain factors to obtain the initial suppression gain factors in a plurality of sub-band ranges;
sorting the initial suppression gain factors in the plurality of sub-band ranges, and calculating a suppression gain coefficient smooth factor;
performing full-band smoothing processing and exponential operation on the initial suppression gain factor by using the suppression gain coefficient smooth factor to obtain the secondary suppression gain factor.

5. The method of claim 1, the operation of performing filtering processing on the target frequency spectrum signal by using the secondary suppression gain factor to obtain a target near-end voice signal comprises:
performing noise reduction processing on the target frequency spectrum signal;
multiplying the secondary suppression gain factor by the target frequency spectrum signal after noise reduction, performing inverse Fourier transform, and performing overlap-adding to obtain the target near-end voice signal.

6. An electronic equipment, the electronic equipment comprising:
a dual microphone array, at least one processor, and a memory, wherein the memory is communicatively connected with the processor, and the memory stores instructions executable by the at least one processor, and the instructions are executed by the at least one processor to enable the at least one processor to perform:
acquiring far-end signals generated by an electronic equipment during a phone conversation, and a first near-end signal and a second near-end signal of a dual microphone array;
performing Fourier transform on the far-end signals to obtain far-end frequency domain information, performing Fourier transform on the first near-end signal to obtain first near-end frequency domain information, and performing Fourier transform on the second near-end signal to obtain second near-end frequency domain information;
performing filtering processing on the far-end frequency domain information by using the updated filter weight coefficient of the previous frame to obtain an echo frequency spectrum;
subtracting the echo frequency spectrum from the first near-end frequency domain information to obtain a first initial error frequency spectrum;
subtracting the echo frequency spectrum from the second near-end frequency domain information to obtain a second initial error frequency spectrum;
performing centroid fitting on the first initial error frequency spectrum and the second initial error frequency spectrum respectively to obtain initial suppression gain factors of the first near-end signal and the second near-end signal, which comprises calculating a first cross-correlation coefficient between the far-end frequency domain information and the first initial error frequency spectrum, and a second cross-correlation coefficient between the far-end frequency domain information and the second initial error frequency spectrum, performing centroid fitting on the first cross-correlation coefficient to obtain a first initial suppression gain factor, and performing centroid fitting on the second cross-correlation coefficient to obtain a second initial suppression gain factor, multiplying the first initial suppression gain factor by the first initial error frequency spectrum to obtain the first error frequency spectrum, and multiplying the second initial suppression gain factor by the second initial error frequency spectrum to obtain the second error frequency spectrum, and using the initial suppression gain factors as variable step-size factors for linear filtering processing of the next frame;
performing residual echo suppression on the first error frequency spectrum and the second error frequency spectrum by using an adaptive zero-pole echo canceller to obtain a target frequency spectrum signal;
after performing sub-band range selection on the initial suppression gain factors, obtaining a smooth factor, and performing full-band smoothing and exponential operation to obtain a secondary suppression gain factor;
performing filtering processing on the target frequency spectrum signal by using the secondary suppression gain factor to obtain a target near-end voice signal.

7. The electronic equipment of claim 6, the dual microphone array is an end-firing arrangement.

8. A non-transitory computer readable storage medium, the computer readable storage medium storing computer-executable instructions which, when executed by an electronic equipment, cause the electronic equipment to perform:
acquiring far-end signals generated by an electronic equipment during a phone conversation, and a first near-end signal and a second near-end signal of a dual microphone array;
performing Fourier transform on the far-end signals to obtain far-end frequency domain information, performing Fourier transform on the first near-end signal to obtain first near-end frequency domain information, and performing Fourier transform on the second near-end signal to obtain second near-end frequency domain information;

performing filtering processing on the far-end frequency domain information by using the updated filter weight coefficient of the previous frame to obtain an echo frequency spectrum;

subtracting the echo frequency spectrum from the first near-end frequency domain information to obtain a first initial error frequency spectrum;

subtracting the echo frequency spectrum from the second near-end frequency domain information to obtain a second initial error frequency spectrum;

performing centroid fitting on the first initial error frequency spectrum and the second initial error frequency spectrum respectively to obtain initial suppression gain factors of the first near-end signal and the second near-end signal, which comprises calculating a first cross-correlation coefficient between the far-end frequency domain information and the first initial error frequency spectrum, and a second cross-correlation coefficient between the far-end frequency domain information and the second initial error frequency spectrum, performing centroid fitting on the first cross-correlation coefficient to obtain a first initial suppression gain factor, and performing centroid fitting on the second cross-correlation coefficient to obtain a second initial suppression gain factor, multiplying the first initial suppression gain factor by the first initial error frequency spectrum to obtain the first error frequency spectrum, and multiplying the second initial suppression gain factor by the second initial error frequency spectrum to obtain the second error frequency spectrum, and using the initial suppression gain factors as variable step-size factors for linear filtering processing of the next frame;

performing residual echo suppression on the first error frequency spectrum and the second error frequency spectrum by using an adaptive zero-pole echo canceller to obtain a target frequency spectrum signal;

after performing sub-band range selection on the initial suppression gain factors, obtaining a smooth factor, and performing full-band smoothing and exponential operation to obtain a secondary suppression gain factor;

performing filtering processing on the target frequency spectrum signal by using the secondary suppression gain factor to obtain a target near-end voice signal.

\* \* \* \* \*